(12) United States Patent
Alos et al.

(10) Patent No.: US 6,546,240 B2
(45) Date of Patent: *Apr. 8, 2003

(54) MOBILE RADIO-TELEPHONE TERMINAL WITH CONTROLLED USAGE

(75) Inventors: Rafaël Alos, Osny (FR); Marc Porato, Loconville (FR); Jean-Marc Dimech, Chaumont en Vexin (FR); Francis Sykes, Paris (FR)

(73) Assignee: Sagem, S.A., Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,023

(22) Filed: Dec. 11, 1998

(65) Prior Publication Data

US 2002/0147028 A1 Oct. 10, 2002

(30) Foreign Application Priority Data

Jun. 20, 1996 (FR) ............................................. 96 07697
Jun. 17, 1997 (WO) ................................. PCTFR9701089

(51) Int. Cl.[7] ............................. H04M 1/66; H04B 1/38
(52) U.S. Cl. ....................................... 455/411; 455/558
(58) Field of Search ................................. 455/558, 561, 455/410, 411, 406, 407, 408, 409; 235/380, 382, 23, 382.5; 380/247, 248, 249, 250; 713/169; 379/144.04, 114.15, 114.2, 114.01

(56) References Cited

U.S. PATENT DOCUMENTS

| | | | | |
|---|---|---|---|---|
| 4,868,846 A | * | 9/1989 | Kemppi | 379/144 |
| 5,266,782 A | * | 11/1993 | Alanara et al. | 235/380 |
| 5,404,580 A | * | 4/1995 | Simpson et al. | 455/558 |
| 5,550,919 A | * | 8/1996 | Kowalski | 380/23 |
| 5,812,955 A | * | 9/1998 | Dent et al. | 455/561 |
| 5,940,773 A | * | 8/1999 | Barvesten | 455/558 |
| 5,978,459 A | * | 11/1999 | Reed et al. | 235/380 |
| 5,991,402 A | * | 11/1999 | Jia et al. | 705/51 |
| 6,091,946 A | * | 7/2000 | Ahvenainen | 455/411 |

FOREIGN PATENT DOCUMENTS

| | | |
|---|---|---|
| DE | 9217379 | 4/1993 |
| DE | 4242151 C | 3/1994 |
| EP | 301740 A2 | 2/1989 |
| EP | 448369 A2 | 9/1991 |
| EP | 0639486 A1 | 2/1995 |
| GB | 2234883 A | 2/1991 |

OTHER PUBLICATIONS

Watahiki et al., "New Packaging Technology of Smart Card," 1989, IEEE/CHMT '89 Japan IEMT Symposium, pp. 101–104.*

Naccache et al., "Cryptographic smart Cards" Jun. 1996, IEEE Micro, pp. 14–23.*

* cited by examiner

Primary Examiner—Charles N. Appiah
(74) Attorney, Agent, or Firm—Eugene C. Rzucidlo

(57) ABSTRACT

A mobile radio-telephone terminal includes a radio means activated by a chip card. The chip card includes a memory containing a subscriber identification word (PIN, IMSI) and is connected to an input of a comparator. The terminal comprises means for receiving the card connected to the radio means and the memory for inputting a particular identification word (PIN, PINUT), associated with the card and is connected to the other input of the comparator. The terminal comprises means for transcoding the input word (PINUT), to match it with the card, to control the activation of the radio means from the subscriber identification word.

2 Claims, 1 Drawing Sheet

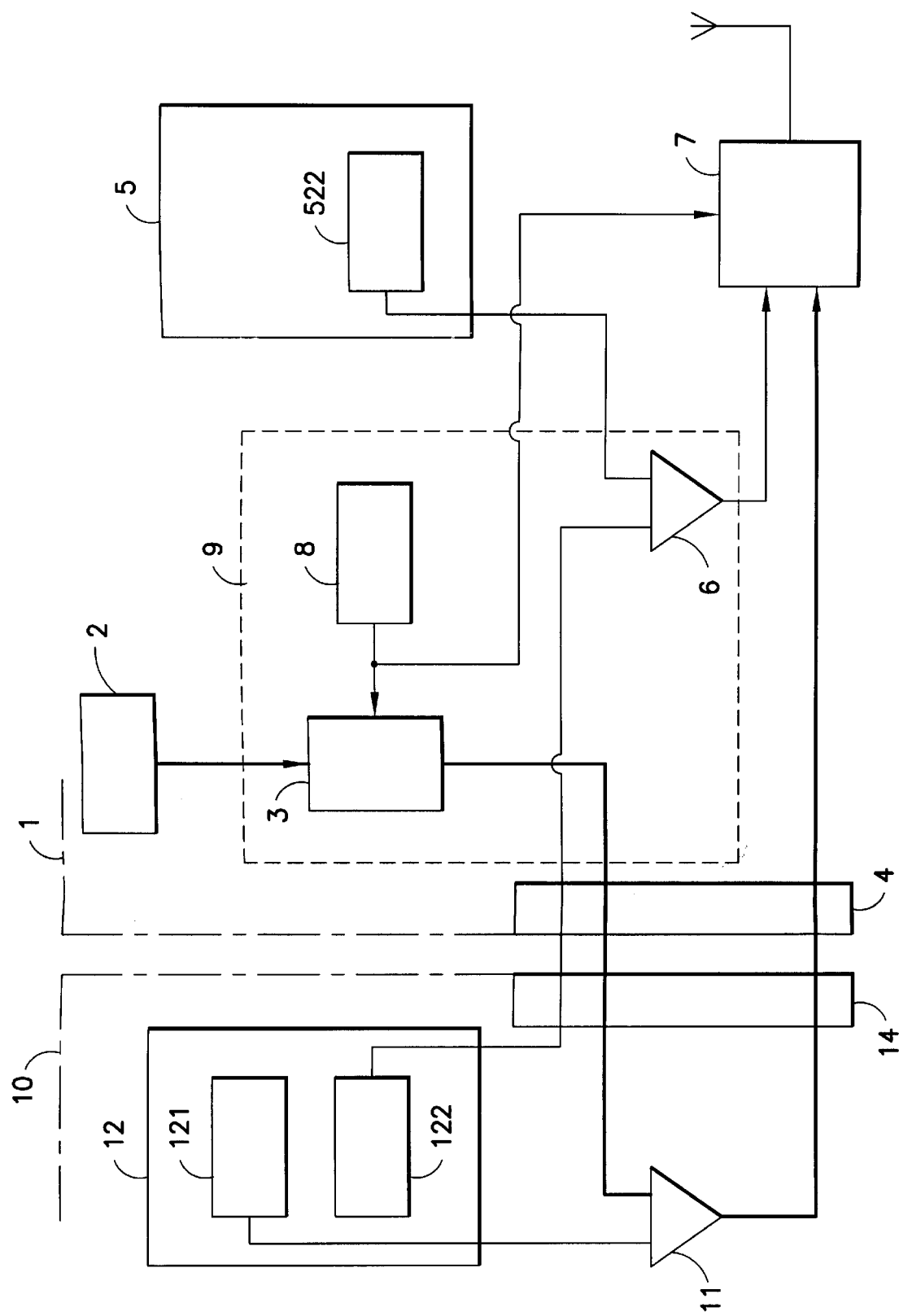

MOBILE RADIO-TELEPHONE TERMINAL WITH CONTROLLED USAGE

BACKGROUND OF THE INVENTION

Mobile radio-telephone terminals are general usage terminals provided with a reader for a SIM (subscriber identification module) chip card identifying the user and verifying payment of a subscription to the radio network concerned. The chip card thus constitutes an electronic key of the terminal.

Such usage of the terminal, however, has disadvantages.

In the first place, any subscriber having misappropriated a terminal could in some cases use it with his own SIM card. Provision is made to input, via a keypad on the terminal, an identification code word for each subscriber, called a PIN (personal identification number) but it can control only the usage of the associated SIM card and thus be ineffective against fraudulent usage of a terminal.

Another case which could arise is that of loaning the terminal for a duration, a calendar period or period of effective usage, limited, for example, to the clients of a hotel. It must be possible to prevent usage of the SIM card and of the terminal after this period.

The present invention aims to resolve these problems.

SUMMARY OF THE INVENTION

To this end the invention relates to a mobile radio-telephone terminal comprising radio means arranged to be activated by a chip card, the chip card comprising memory means containing a subscriber identification word and connected to an input of a comparator, the terminal comprising means for receiving the card, which are connected to the radio means, means for inputting a particular identification word, associated with the card, and arranged to be connected to the other input of the comparator, characterised in that it comprises means for matching it with the card, which are arranged to control the activation of the radio means from the subscriber identification word.

Thus the two constituents of the terminal-card assembly with a word to be input cannot be used separately from each other. A misappropriated or expired card cannot therefore be used on another terminal and, inversely, a stolen terminal cannot be controlled by just any card.

In the prior art the chip card and the input means functionally constituted an autonomous command unit, controlling, without any other means of control, the radio means.

In accordance with the invention the afore-mentioned unit no longer has this autonomy since the terminal has matching means which control the action of the chip card upon the radio means. The terminal is thus personalised and the card is linked thereto.

In a preferred embodiment the matching means comprise, between the input means and the reception means of the card, means for transcoding the input word.

In this embodiment the autonomy of the command unit is controlled by the fact that the identification word indicated to the user is actually fictitious and only becomes real, ie. identical to that in the memory, by virtue of the transcoding means of the terminal. The card can therefore activate the radio means of a terminal only if this terminal is the one which carries out the expected transcoding.

To summarise, the card is slave to the terminal which is itself slave to the card.

In particular the identification word carried by the chip card remains secret to any user, authorised or not, since the PIN word which the user inputs is distinct from that in the memory.

In another preferred embodiment the matching means comprise memory means containing data matched with the data contained in the memory means of the card, controlling comparator means arranged to read the memory means of the card and to authorise activation of the radio means only after the said match has been verified.

Thus the matching is controlled very simply.

The invention will be better understood with the aid of the following description of an example including the two afore-mentioned preferred embodiments of the invention, with reference to the single figure of the attached drawing.

BRIEF DESCRIPTION OF THE DRAWING

FIG. 1 is a block diagram of the terminal of the invention with a chip card.

DETAILED DESCRIPTION OF THE INVENTION

The terminal illustrated, referenced 1, is in this case a radio terminal, for example, for cellular telephony, for example, GSM, comprising a keypad 2 for inputting a user identification word (and dialling) controlling a transcoding or encrypting arithmetic unit 3 connected at the output to a connector/reader 4 arranged to receive a connector 14 of a chip card 10. The transcoding of the unit 3 can in this case be determined and modified on the keypad by a Teaser of the terminal 1 who lends it to successive users. The card 10 being illustrated separately from the terminal 1, the three dashed lines linking the connectors 4 and 14 indicate the connections which are established upon connection of the card 10.

The card 10 comprises a comparator 11, actually a microprocessor, connected, once the card 10 has been connected, to an input path from the output of the unit 3 via the connectors 4 and 14. A second input path of the comparator 11 is connected to a memory 12 of the card 10 comprising a user identification number, PIN, referenced 121, as well as other data of the same type such as IMSI (international mobile subscriber identity), referenced 122. The output of the comparator 11 commands the activation, via the connectors 4 and 14 of a radio transceiver unit 7 of the terminal 1. The activation/deactivation of the radio unit 7 is, moreover, controlled by a comparator 6 connected at the input, on the one hand, to the zone 122 (IMSI) of the memory 12 of the card 10 and, on the other hand, to a memory zone 522 of a memory 5 of the terminal 1, also containing the IMSI data. The functions of the unit 3 and of the comparator 6 are, in practice, carried out by a microprocessor 9.

As the invention can be applied to various types of terminals since it has no bearing on the nature of the operation of the terminal, in this case by radio, but on the control of access to this function, the telephone handset and its circuits for connection to the radio unit 7 have not been shown.

The operation of the terminal 1 will now be explained.

The operator having defined a transcoding or encrypting key and having stored it in the transcoding unit 3, then determines, from the real PIN, which he knows and which is stored in the card 10, another, virtual, PIN which he communicates to the user and which will be called PINUT. The PINUT is calculated by inverse transformation of the PIN.

The user having introduced the card 10 into the connector 4 of the associated terminal 1 inputs into the keypad 2 the PINUT which is transcoded in the unit 3 into the PIN desired and recognised by the comparator 11 which commands activation of the radio unit 7.

This command in itself will not suffice since, in this example, two matching means are provided, which are the transcoding unit 3 and the memory 5 with the comparator 6. It will thus be understood that what is herein referred to as control by the comparator 6 could also be called command and that, in other examples, a single command 6 or 11 would suffice.

The comparator 6 in this case controls the agreement between the contents of the memories 522 and 122 and thus authorises activation of the radio unit 7 by the comparator 11.

The microprocessor 9 also prevents any change in the PIN or a possible code word for controlling the access to the terminal 1.

In this example the microprocessor 9 comprises a usage counter 8 or timer, equivalent to a charge rate device which, for example, counts the durations of actual usage of the terminal 1 and which, by comparison with a threshold value input in the memory 5 by the operator, inhibits transcoding of the unit 3 to make it transparent. The number input into the keypad is transmitted to the card 10 without transformation.

The terminal can then only function in a standard manner with the PIN code of the card which is inaccessible to the user. In other words the Teaser makes provision to return the terminal 1 to a state of operation without matching when the terminal is not being loaned, ie. he makes provision to be able to use the terminal himself by inputting the PIN in the memory in the card without transcoding or time limit.

Leaving the afore-mentioned locked state thus in this case leads to a general usage state of operation in accordance with the prior art, which can then move towards the state with matching described at the beginning. Transition from the locked state to the general usage state is achieved by inputting the actual PIN, this input being detected by the microprocessor 9. Locking of the terminal 1 is thus deactivated, ie. the terminal 1 can operate with other chip cards, the transcoding unit 3 then being logically transparent. In the same way the chip card 10 can then operate with any general usage terminal.

What is claimed is:

1. A mobile radio-telephone terminal comprising:
   radio means arranged to be activated by a chip card, the chip card comprising memory means containing a subscriber identification word (PIN, IMSI) and connected to an input of a comparator,
   the terminal comprising means for receiving the card, which are connected to the radio means,
   means for inputting a particular identification word (PIN; PINUT), associated with the card) and arranged to be connected to the other input of the comparator through transcoding means for transcoding said particular identification word (PINUT) into a read PIN word stored in the chip card, characterized in that it comprises means for matching it with the card, which are arranged to control the activation of the radio means from the subscriber identification word; and
   a charge rate counter for inhibiting the transcoding means so that the radio means are activated by inputting a non-transcoded PIN code of the card.

2. The terminal according to claim 1, wherein the matching means comprise memory means containing data matched with the data contained in the memory means of the card, controlling comparator means arranged to read the memory means of the card and to authorize activation of the radio means only after the said match has been verified.

* * * * *